Sept. 17, 1968   E. CARNALL, JR., ET AL   3,402,226
PROCESS OF HOT PRESSING MAGNESIUM OXIDE INFRARED
TRANSMITTING OPTICAL ELEMENTS
Original Filed Oct. 2, 1961   3 Sheets-Sheet 1
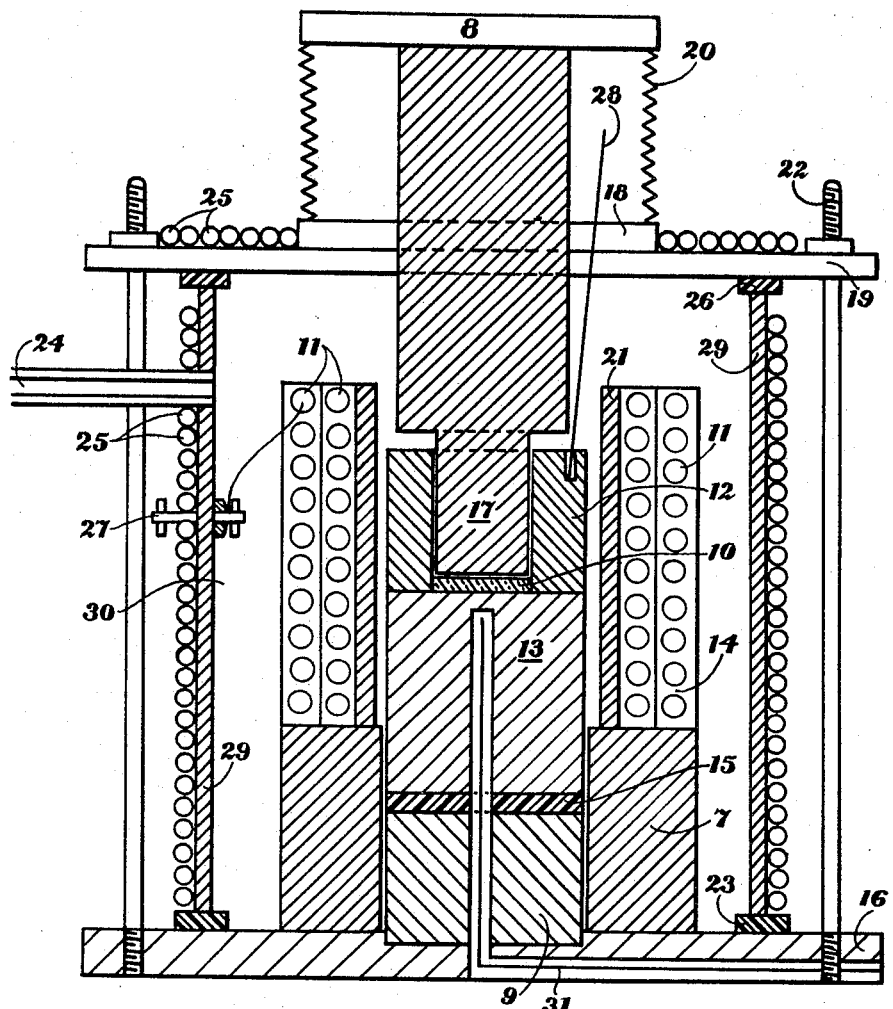
Edward Carnall, Jr.
Sherley E. Hatch
INVENTORS
BY
ATTORNEYS Edward Carnall, Jr.
Sherley E. Hatch
B. Frank Smith
INVENTORS
BY
ATTORNEYS

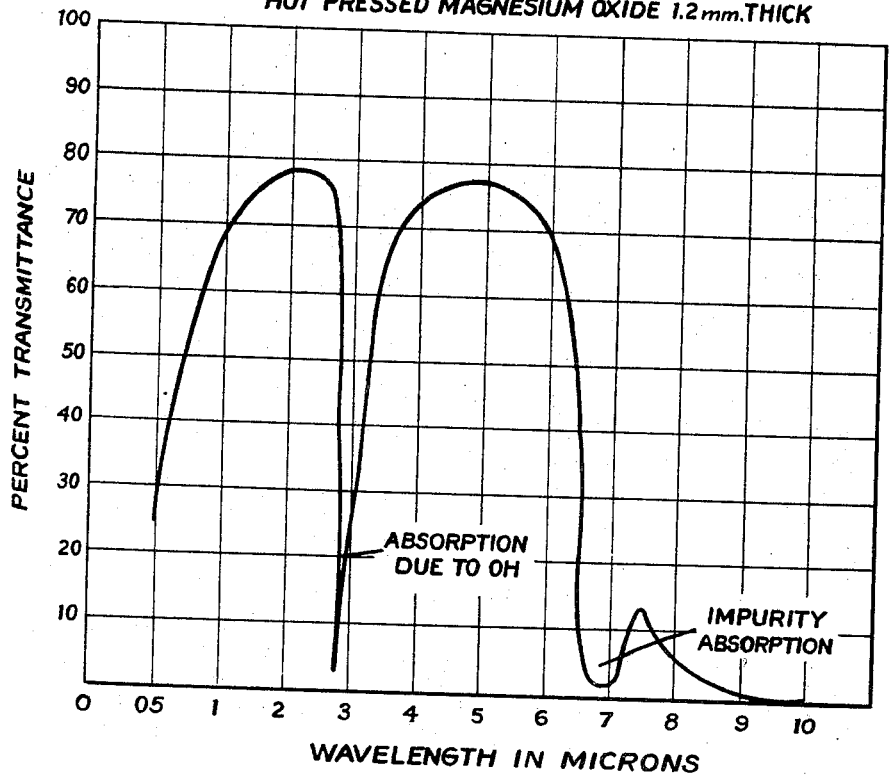

3,402,226
PROCESS OF HOT PRESSING MAGNESIUM OXIDE INFRARED TRANSMITTING OPTICAL ELEMENTS
Edward Carnall, Jr., and Sherley E. Hatch., Rochester, N.Y., assignors to Eastman Kodak Company, Rochester, N.Y., a corporation of New Jersey
Original application Oct. 2, 1961, Ser. No. 142,149, now Patent No. 3,236,595, dated Feb. 22, 1966. Divided and this application Sept. 15, 1965, Ser. No. 505,206
6 Claims. (Cl. 264—1)

This is a division of application Ser. No. 142,149 filed Oct. 2, 1961, now U.S. Patent No. 3,236,595.

This invention relates to optical elements and to methods for making optical elements. More particularly, this invention relates to methods for hot pressing transparent polycrystalline optical elements of various geometrical shapes under high pressures, temperatures and vacuum from magnesium oxide powder. These elements may be employed as windows in missiles and projectiles and related devices requiring such infrared optics. These magnesium oxide windows are also useful as substrates for optical filters and detectors. Magnesium oxide windows produced by our process are very stable to thermal shock and have desirable transmittance characteristics.

An object, therefore, of the present invention is to provide an article of manufacture consisting essentially of transparent polycrystalline magnesium oxide.

Another object is to provide a homogeneous solid of molded magnesium oxide having a density of from 99% up to and including the theoretical density.

Still another object is to provide a molded optical element which transmits in the visible and infrared regions of the electromagnetic spectrum.

Another object is to provide an infrared transmitting element which will be suitable for use in missiles, projectiles, satellites and related devices.

Yet another object is to provide a method of molding magnesium oxide to form such optical elements.

In accordance with a feature of this invention, magnesium oxide powder is hot pressed in a suitable compression mold under condition of high pressure, high temperature and high vacuum or inert atmosphere into a solid molded unit of transparent polycrystalline magnesium oxide. The mold may be of any suitable shape to form a window or a lens of desired contour.

The invention will be further understood by reference to the following detailed description and drawings in which:

FIG. 1 is a view of a transparent polycrystalline solid molded from magnesium oxide powder;

FIG. 2 is an elevational view, partly in section, of a compression molding device for molding magnesium oxide powder in accordance with this invention;

FIG. 4 is a graph showing the specular transmittance of hot pressed magnesium oxide at various wavelengths of light.

Figure 3:
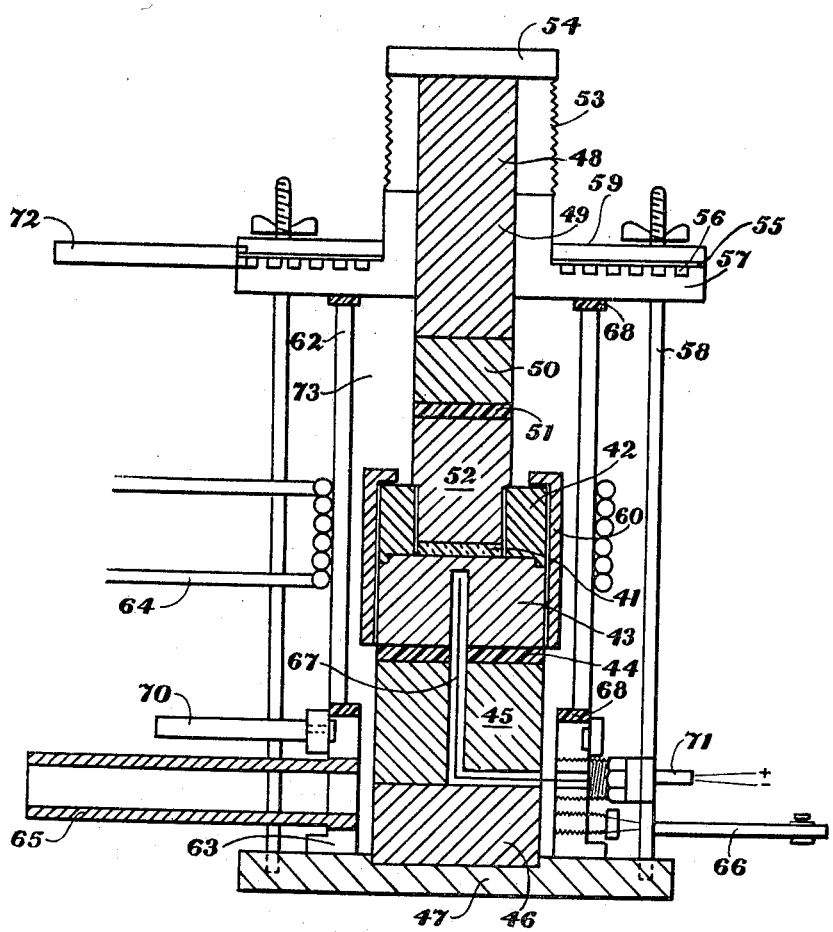
FIG. 3 is an elevational view, partly in section, of a compression molding device for molding magnesium oxide powder into optical units which employs high frequency heating.

The molding apparatus shown in FIG. 2 comprises a base 16, a silicon gasket 23, a block 9, a thermal insulator 15, a block 13, a molding cylinder 12, a molding plunger 17, having a head 8 which is adapted to be attached to a prime mover, not shown such as the piston of a hydraulic press to move the plunger 17 vertically into and out of molding cylinder 12 and thereby press the magnesium oxide powder into the solid unit shown at 10.

The head 8 is attached to aligning ring 18 by metal bellows 20 thereby assuring a vacuum seal around the upper portion of the plunger 17.

A cylinder 21 encloses the molding cylinder 12 and lower portion of the plunger 17 and is supported on block 7. A heating unit 14 comprising a refractory casing is positioned around cylinder 21 and is also supported on block 7 and contains electric heating coils 11, the terminals for which are shown at 27.

A cylinder 29 is positioned concentrically in respect to cylinder 21 and forms a vacuum chamber 30, the ends of which are closed by gaskets 23 and 26 and plates 16 and 19. Cooling coils 25 are positioned in contact with the outer surface of cylinder 29. A conduit 24 connects the vacuum chamber 30 to a suitable vacuum system not shown. The assembly is further secured by the coaction of top plate 19 and threaded rods 22 and base plate 16.

The temperature is measured by either one or by both thermocouples 28 and 31 which are suitably located in channels respectively positioned adjacent the molding position.

The blocks 9 and 13 and cylinder 12 and plunger 17 may be made of molybdenum, molybdenum alloy or other materials possessing high strength at elevated temperatures.

A satisfactory hot pressed, transparent polycrystalline magnesium oxide window may be made employing the apparatus shown in FIG. 2 as follows:

Magnesium oxide powder is introduced into the cavity of cylinder 12 beneath plunger 17. Chamber 30 is evacuated through pipe 24. Next cooling water is circulated through the cooling coils 25 and also through the platens, not shown, of the hydraulic press, and then electric current is supplied to the heater coils 11 through terminals 27. The temperature of the mold is monitored by means of platinum-rhodium thermocouples 28 and 31. When the temperature, as indicated by thermocouple 28, reaches 860° C., force is applied to the head 8 of plunger 17 by the hydraulic press, not shown, and the pressure is raised on the magnesium oxide powder to approximately 60,000 p.s.i. This pressure is maintained on the magnesium oxide for 20 minutes while the indicated temperature is held at 860° C. At the end of the pressing period, the power is shut off and the pressure is released slowly. The vacuum pump is shut off and argon, or other inert gas, is bled into chamber 30. The assembly is allowed to cool to about 200° C. as recorded by the thermocouples.

The plunger 17 is now withdrawn from the cylinder 12 and the piece of polycrystalline transparent magnesium oxide 10 is permitted to cool to approximately room temperature and is removed from the apparatus and employed as desired.

Referring to FIG. 3, an elevational view, partly in section, of another modification of the molding apparatus is shown. This modification employs high frequency heating. In general, however, the parts of the apparatus are similar in kind and operation to that shown in FIG. 2.

The pressed magnesium oxide powder is shown at 41. The apparatus comprises molding cylinder 42, molding block 43, insulator 44 and supporting blocks 45 and 46. Block 46 rests on base 47. A graphite sleeve 60 is positioned between induction heating coils 64 and members 42 and 43. Also positioned on base 47 is a cylindrical chamber 63 through which vacuum conduit 65, a vacuum release conduit 66 and a thermocouple conduit 71 extend. A water pipe 70 connects the chamber 63 to a water supply, not shown. The thermocouple is shown at 67. A quartz cylinder 62 is positioned on member 63 and separated therefrom by a gasket 68. Cylinders 62 and 63 thus form a vacuum chamber 73, the upper portion of which is closed by plate 57 having water cooling channels 56 therein. Cooling water is supplied through conduit 72 to channels 56, a gasket 55 forms the upper surface of the channels 56 and is held in position by clamping plate 59. The assembly is clamped by a plurality of clamping rods 58 and cooperating wind nuts.

The molding plunger 48 extends through an aligning aperture in plate 57. Freedom of motion of the plunger and a vacuum seal are achieved by means of the metal bellows 53, the ends of which are sealed respectively to the head 54 of the plunger 48 and to plate 57.

The molding plunger assembly 48 comprises three sections. Section 49 is preferably made of Nichrome or stainless steel; section 50 of Nichrome and section 52 of molybdenum or molybdenum alloys. A thermal insulator 51 is positioned between sections 50 and 52. The various plunger sections are held together by threaded pins.

Top plates 57 and 59 and the base plate 47 may be of aluminum. Cylinder block 42, block 43 and plunger 52 preferably are of molybdenum or molybdenum alloys, block 45 of Nichrome and block 46 of stainless steel. The insulators 44 and 51 are of transite or of material of similar or superior thermal insulating properties which will withstand the high temperatures and pressures involved.

Since molybdenum does not couple the high-frequency field efficiently, a graphite sleeve 60, which fits snugly over the molding cylinder is employed. The high-frequency field couples and heats the graphite which in turn heats the molding cylinder by thermal conduction.

If a situation arises in which it is desirable to eliminate the graphite susceptor 60, it is preferable to make the plunger section 52, cylinder 42 and block 43 of a material which couples efficiently with the high-frequency field. Materials such as the high temperature nickel base alloys may be used.

The apparatus of FIG. 3 is operated at substantially the same schedule of temperature, pressure and vacuum as described above, but due to the high-frequency heating, the heating cycle can be considerably reduced.

The above described hot pressing operations give optimum results. However, satisfactory transparent polycrystalline magnesium oxide windows have been produced at temperatures varying from 800° C. to 860° C.

Pressures have been varied from about 40,000 p.s.i. to 65,000 p.s.i. Pressures less than 40,000 p.s.i. may result in a window that is not completely pressed to a homogeneous mass. Any pressure in excess of the optimum 65,000 p.s.i. does not seem to contribute to the quality of the window.

The time at pressing temperature has been varied within the limits of about five to twenty minutes. At times less than five minutes, the window may not be pressed out. It has further been found out that longer heating and pressing times may be employed with the benefit of a slight reduction in pressing temperature.

Limits are imposed on hot pressing by the available mold materials. The plunger, molding cylinder and supporting block must all be strong at high temperatures. An alloy made of molybdenum and titanium may be used for pressing magnesium oxide powder.

It appears that magnesium oxide of high purity and a submicron powder size is most desirable for good results.

A major problem in the hot-pressing work is the unwanted bonding between the magnesium oxide powder and mold parts. Some cracking of magnesium oxide windows has occurred because of bonding to the molybdenum mold parts. It has been found effective to cover the parts of the mold contacting the magnesium oxide with a light coat of graphite. This prevents sticking and cracking. It may also be helpful to line the mold cavity with a thin foil of a material such as tungsten.

Magnesium oxide powder, in accordance with our invention, may be formed into various geometrical shapes and sizes. Cylindrical pieces varying in diameter have been pressed. Lenses may be pressed in carefully polished molds with accurate radius of curvature and the resultant pressing will have a finished optical surface within close tolerance. Hence, desired surfaces can be formed during the pressing operation on the magnesium oxide article without the need of additional polishing. However, polishing of the hot-pressed magnesium oxide surfaces may be done, if desired. The size and shape of hot-pressed magnesium oxide pieces is not limited and larger diameter pieces having intricate shapes may be made.

Magnesium oxide windows may be suitably sealed into metal rings to provide infrared transmitting windows hermetically sealed to the metal. The metal may be used as a mounting surface.

Properties of polycrystalline magnesium oxide

| | |
|---|---|
| Color | Water white. |
| I.R. transmission | Long wavelength limit is 8.5 microns (dependent on purity). |
| Index of refraction | 1.711 at 1.8 microns. |
| Reflection loss | 11% at 4 microns. |
| Hardness | 5-6 moh. |
| Density | 3.58 g./ml. |
| Thermal shock | Good. |
| High temperature resistance | Good. |
| Coefficient of expansion | $13.9 \times 10^{-6}/°$ C. |
| Solubility | Insol. $H_2O$. |
| Workability, i.e. grinding and polishing | Usual glass working techniques. |
| Thermal conductivity | 0.048 cal./cm.$_2$/sec./° C. at 300° C. |

The density is measured as follows on the hot pressed magnesium oxide.

The density was measured by the hydrostatic weighing method as described on page 104 in Chapter III on density in A. Weissberger's Physical Methods of Organic Chemistry, vol. I, Interscience Publishers, Inc., N.Y. (1945). This method is widely recognized as suitable for high precision density measurements of solids and is also described in Section 4.1.3.3 of vol. 6, Part A of Methods of Experimental Physics, Academic Press, N.Y. (1959).

Deviations from theoretical density should be indicative of second phase inclusions in the pressing such as impurities or porosity.

We claim:
1. The method of forming a homogeneous solid of molded magnesium oxide having a density in the range of from 99% up to and including theoretical density which comprises molding magnesium oxide powder in an inert atmosphere under a pressure within the range of from 40,000 to 65,000 pounds per square inch and at a temperature within the range of 800° C. to 860° C.

2. The method of forming a homogeneous solid of molded magnesium oxide having a density in the range of from 99% up to and including theoretical density which comprises molding magnesium oxide powder in a vacuum under a pressure within the range of from 40,000 to 65,000 pounds per square inch and at a temperature within the range of 800° C. to 860° C.

3. The method of forming a homogeneous transparent polycrystalline solid of magnesium oxide having a density in the range of from 99% up to and including theoretical density which comprises hot pressing magnesium oxide powder under a pressure within the range of 40,000 to 65,000 pounds per square inch at a temperature within the range of 800° C. to 860° C. while in an inert atmosphere.

4. The method of forming a homogeneous transparent polycrystalline solid of magnesium oxide having a density in the range of from 99% up to and including theoretical density which comprises hot pressing magnesium oxide powder under a pressure within the range of 40,000 to 65,000 pounds per square inch at a temperature within the range of 800° C. to 860° C. while in a vacuum.

5. The method of forming a homogeneous transparent polycrystalline solid of magnesium oxide having a density in the range of from 99% up to and including theoretical density which comprises hot pressing magnesium oxide powder under a pressure of approximately 60,000 pounds per square inch at a temperature of 860° C. while in an inert atmosphere.

6. The method of forming a homogeneous transparent polycrystalline solid of magnesium oxide having a density in the range of from 99% up to and including theoretical density which comprises hot pressing magnesium oxide powder under a pressure of approximately 60,000 pounds per square inch at a temperature of 860° C. while in a vacuum.

References Cited

UNITED STATES PATENTS

| | | | |
|---|---|---|---|
| 2,091,569 | 8/1937 | Ridgway et al. | 106—58 |
| 3,141,782 | 7/1964 | Livey et al. | 106—55 |

OTHER REFERENCES

"Fabrication of Infrared Transmitting Materials by Hot Pressing Techniques," Pt. 2, October 1959, pp. iii, 12, 21, 32 and 74.

JAMES A. SEIDLECK, *Primary Examiner.*

A. H. KOECKERT, *Assistant Examiner.*